United States Patent [19]
Lulham et al.

[11] Patent Number: 5,595,623
[45] Date of Patent: Jan. 21, 1997

[54] METHOD FOR MAKING A BARRIER FILM WITH IMPROVED EXTENSIBILITY FOR CHEESE PACKAGING

[75] Inventors: Cedric M. Lulham, Gray Ct.; Gloria G. Toney, Greer, both of S.C.

[73] Assignee: W. R. Grace Co.-Conn., Duncan, S.C.

[21] Appl. No.: 455,004

[22] Filed: May 31, 1995

Related U.S. Application Data

[62] Division of Ser. No. 871,595, Apr. 16, 1992, which is a continuation of Ser. No. 614,768, Nov. 16, 1990, abandoned.

[51] Int. Cl.$^6$ ................................. B29C 55/28
[52] U.S. Cl. .................. 156/244.14; 156/244.21; 264/514; 264/564; 264/566; 264/171.28; 264/173.14; 426/127
[58] Field of Search ................ 264/173.12, 173.14, 264/171.28, 514, 564, 566; 156/244.14, 244.21; 425/133.1, 462; 426/127

[56] References Cited

U.S. PATENT DOCUMENTS

| | | | |
|---|---|---|---|
| 4,284,674 | 8/1981 | Sheptak | 428/69 |
| 4,398,635 | 8/1983 | Hirt | 206/532 |
| 4,407,873 | 10/1983 | Christensen et al. | 428/35 |
| 4,457,960 | 7/1984 | Newsome | 428/35 |
| 4,495,249 | 1/1985 | Ohya et al. | 428/516 |
| 4,532,189 | 7/1985 | Mueller | 264/171.28 |
| 4,671,987 | 6/1987 | Knott, II | 428/216 |
| 4,683,170 | 7/1987 | Tse et al. | 428/349 |
| 4,735,855 | 4/1988 | Wofford et al. | 428/349 |
| 4,746,562 | 5/1988 | Fant | 428/213 |
| 4,753,700 | 6/1988 | Fant | 264/173.14 |
| 4,755,402 | 7/1988 | Oberle | 264/210.7 |
| 4,755,419 | 7/1988 | Shah | 428/220 |
| 4,801,486 | 1/1989 | Quacquarella | 428/34 |
| 4,855,183 | 8/1989 | Oberle | 428/345 |
| 4,863,784 | 9/1989 | Lustig et al. | 428/218 |
| 4,909,881 | 3/1990 | Garland | 156/229 |
| 4,956,212 | 9/1990 | Bekele | 428/36 |
| 4,976,898 | 12/1990 | Lustig et al. | 264/171.28 |
| 5,053,259 | 10/1991 | Vicik | 428/36.91 |
| 5,094,799 | 3/1992 | Takashige et al. | 264/173.12 |
| 5,234,731 | 8/1993 | Ferguson | 426/127 |

*Primary Examiner*—Jeffery R. Thurlow
*Attorney, Agent, or Firm*—Mark B. Quatt; Leigh P. Gregory; John J. Wasatonic

[57] ABSTRACT

A method for making a film which is useful in the packaging of newly formed blocks of cheese and demonstrates flexibility, extensibility, and improved sealing strength comprises extruding an ethylene vinyl acetate/very low density polyethylene sealing layer. In addition to barrier properties, flexibility and extensibility are, preferably, also provided by coextruding a core layer of ethylene vinyl alcohol copolymer containing at least 32% by weight of ethylene with the sealing layer. A preferred method for making a film comprises coextruding a core layer of ethylene vinyl alcohol copolymer, two intermediate layers each comprising a polyamide, at least one of which having an ionomer blended therewith, outer layers of very low density polyethylene, ethylene vinyl acetate, and anti-blocking agent, and adhesive polymeric materials to adhere the outer blend layers to the respective intermediate polyamide layers, immediately expanding the extrudate to a dimension appropriate for achieving the desired thickness of the final film, and cooling the film.

13 Claims, 1 Drawing Sheet

METHOD FOR MAKING A BARRIER FILM WITH IMPROVED EXTENSIBILITY FOR CHEESE PACKAGING

This is a Divisional Application of application Ser. No. 871,595, filed Apr. 16, 1992, which is a continuation of application Ser. No. 614,768, filed Nov. 16, 1990, now abandoned.

BACKGROUND OF THE INVENTION

This invention relates generally to the art of packaging films and more particularly to films useful in the packaging of food products, most particularly, cheese.

At present, one common means used in the cheese making art to form large blocks of cheese is the Wincanton block former tower. The blocks formed by such tower are typically about forty pounds in weight. The blocks coming out of the tower are soft and very pliable and gelatinous in texture. As such, they tend to settle and conform to the shape of the container in which they are put. As these blocks cool and knit, they take the shape of the interior of the container.

When pouches are used in the vacuum packaging of the newly formed blocks, it has been found that excessive stiffness of the pouch film often causes broken block edges, irregular corners and wrinkled surfaces. Thus, it is preferable to provide a flexible, extensible film for use in such cheese pouches. However, the film employed must also be able to withstand significant load without seal failure and must exhibit excellent barrier properties.

Of interest is U.S. Pat. No. 4,284,674 issued to Sheptak, disclosing a multilayer film having a core layer of ethylene vinyl alcohol copolymer adhered on each side to nylon, each nylon layer in turn being adhered to a chemically modified polyolefin, and a further layer of primer material suitable to adhere the modified polyolefin to an outer layer of polypropylene or other materials suitable for conveying toughness, flex-crack resistance and moisture barrier properties to the multi-ply film.

Also of interest is U.S. Pat. No. 4,355,721 issued to Knott et al, disclosing a coextruded multilayer sheet having a first layer of nylon, an ethylene vinyl alcohol copolymer barrier layer, another layer of nylon, an adhesive layer, and another outside layer of, for example, high density polyethylene.

Of interest is U.S. Pat. No. 4,398,635 issued to Hirt, disclosing a medication package in which a coextruded multiple layer sheet may have a structure including a layer of ethylene vinyl alcohol copolymer sandwiched between adjacent layers of nylon, and in which one of the nylon layers may be further adhered to a tie resin. The nylon layers may form either an outside surface or, in one example, internal layers with additional layers of polymeric materials added to each side of the sandwich structure.

Of interest is U.S. Pat. No. 4,407,873 issued to Christensen et al, disclosing a packaging material for retort applications including a heat seal layer of linear low density polyethylene, a second layer of linear low density polyethylene with optionally 0% to 80% medium density polyethylene blended into the second layer, a third layer of anhydride modified medium density polyethylene, a fourth layer of nylon, a fifth layer of ethylene vinyl alcohol copolymer, and a sixth layer of nylon.

Of interest is U.S. Pat. No. 4,457,960 issued to Newsome, disclosing a multilayer film having a core layer of a barrier material such as ethylene vinyl alcohol copolymer and blends of such. This film may be shrinkable, may be melt extruded, and may contain outside layers having a blend of linear low density polyethylene and ethylene vinyl acetate copolymer.

Of interest is U.S. Pat. No. 4,495,249 issued to Ohya et al, disclosing a five-layer film having a core layer of a saponified copolymer of ethylene and vinyl acetate, outer layers of a mixture of linear low density polyethylene and ethylene vinyl acetate copolymer, and two adhesive layers disposed between the core layer and outer layers.

Also of interest is U.S. Pat. No. 4,683,170 issued to Tse et al, disclosing a film having a sealant layer which may be ethylene copolymer, an outer nylon blend layer, a core ethylene vinyl alcohol copolymer layer and at least one adhesive tie layer such as for adhering the core layer to the sealant layer.

Of additional interest is U.S. Pat. No. 4,746,562 issued to Fant, disclosing a multilayer film having a core layer of ethylene vinyl alcohol copolymer, two intermediate polyamide layers, outer blend layers of linear low density polyethylene and antiblock and adhesive polymeric materials adhering the outer blend layers to the respective intermediate polyamide layers.

Of further interest is U.S. Pat. No. 4,755,419 to Shah, disclosing a barrier film having an ethylene vinyl alcohol copolymer core layer, two intermediate polyamide layers, two outer layers which are either a blend of linear low density polyethylene, linear medium density polyethylene, and an ethylene vinyl acetate copolymer or a blend of an ethylene propylene copolymer and a polypropylene, and two adhesive tie layers for adhering each of the intermediate layers to a respective outer layer.

Also of interest is U.S. Pat. No. 4,956,212, issued to Bekele on Sep. 11, 1990, disclosing a peelable barrier film for vacuum skin packages and the like having a sealing layer which is either ethylene vinyl acetate copolymer or very low density polyethylene and having an abuse layer which may be a blend of ethylene vinyl acetate copolymer and very low density polyethylene.

Of related interest is U.S. Pat. No. 4,863,784, issued to Lustig et al. on Sep. 5, 1989, disclosing a heat shrinkable multilayer film with a vinylidene chloride-methyl acrylate copolymer core which further discloses an ethylene vinyl acetate/very low density polyethylene outer layer to be unacceptable.

SUMMARY OF THE INVENTION

It is thus an object of the present invention to provide a flexible, extensible film for use in cheese pouches which are used in the packaging of newly formed cheese blocks.

It is a further object of the present invention to provide a sealable, barrier film which is capable of withstanding significant load without seal failure.

It is yet another object of the present invention to provide a novel polymeric film structure.

These as well as other objects are achieved by providing, for example, a multilayer film having an ethylene vinyl alcohol copolymer core layer; two intermediate polyamide layers; two surface layers which are each a blend of a very low density polyethylene and an ethylene vinyl acetate copolymer; and each of the intermediate layers being adhered to a respective surface layer by a layer of adhesive polymeric material.

In another aspect of the present invention, a method of making a seven-layer film requires feeding an ethylene vinyl alcohol melt through a first extruder to a coextrusion die; feeding a polyamide melt through a second extruder to the coextrusion die; feeding a melt of an adhesive polymeric material through a third extruder to the coextrusion die; feeding a blend of very low density polyethylene and an ethylene vinyl acetate copolymer, as a melt, through fourth and fifth extruders to the coextrusion die; extruding the seven layer film from the coextrusion die; cooling the coextruded film; collapsing the cooled film; and forming pouches in-line.

DEFINITIONS

The term "LLDPE" as used herein refers to linear low density polyethylene which generally is understood to include that group of ethylene/alpha-olefin copolymers having limited side chain branching and which fall into a density range of 0.916 to 0.940 g/cc. Sometimes linear polyethylene in the density range from 0.926 to 0.940 is referred to as linear medium density polyethylene (LMDPE). Typical brand names are Dowlex from Dow Chemical Company, Ultzex and Neozex from Mitsui Petro Chemical Company, and Sclair from duPont. The alpha-olefin copolymers are typically butene-1, pentene-1, hexene-1, octene-1, etc.

The terms "VLDPE" and "ULDPE" as used herein refer to very low density polyethylene (VLDPE) and ultra-low density polyethylene (ULDPE) which are ethylene/alpha-olefin copolymers having a density of less than about 0.915 g/cc and, more specifically, usually 0.912 g/cc or below and may be below 0.89 g/cc. Typical VLDPE resins are available from Union Carbide and are believed to principally or usually have butene, or isobutene as a comonomer. The very low density polyethylenes as compared to LLDPE, usually have significantly higher copolymer content and distinctly different properties making them a distinct class of polymers. Typically, resins designated "ULDPE" resins come from Dow and are believed to have octene as the comonomer. One example of such is Dow's Attane 4002. There is a slight difference in properties between the Dow and the Union Carbide resins which is thought to be attributable to the comonomer. As used herein the term "linear ethylene/alpha-olefin copolymer having a density of less than 0.915 g/cc" encompasses both VLDPE and ULDPE.

The term "ethylene vinyl alcohol copolymer", "EVOH" and the like is used herein to include saponified or hydrolyzed ethylene vinyl acetate copolymers, and refers to a vinyl alcohol copolymer having an ethylene comonomer, and prepared by, for example, hydrolysis of vinyl acetate.

The term "polyamide" refers to high molecular weight polymers having amide linkages along the molecular chain, and refers more specifically to synthetic polyamide such as various nylons, nylon 6 and nylon 12, for example. This term also refers to copolymers of polyamides such as nylon 6/66 and nylon 6/12.

The terms "intermediate layer", "interior layer", and the like are used herein to define a layer in a multilayer film bonded on both sides by other layers.

The terms "anti-blocking agent" and the like are used herein to describe substances that reduce the tendency of films or sheets of polyolefin film to stick or adhere to each other or to other surfaces when such adhesion is otherwise undesirable. Typical chemicals such as colloidal silica, finely divided silica, clays, silicons, and certain amides and amines are useful in this application. Antiblock agents are often supplied in a masterbatch form where they are included in a minor portion, with the major portion of the masterbatch comprising, for example, a polyethylene.

BRIEF DESCRIPTIONS OF THE DRAWING

Details of the present invention are provided by reference to the sole drawing figure where FIG. 1 represents a schematic cross-section of a preferred embodiment of a multilayer film of the invention.

DESCRIPTION OF THE PREFERRED EMBODIMENTS

Figure 1:
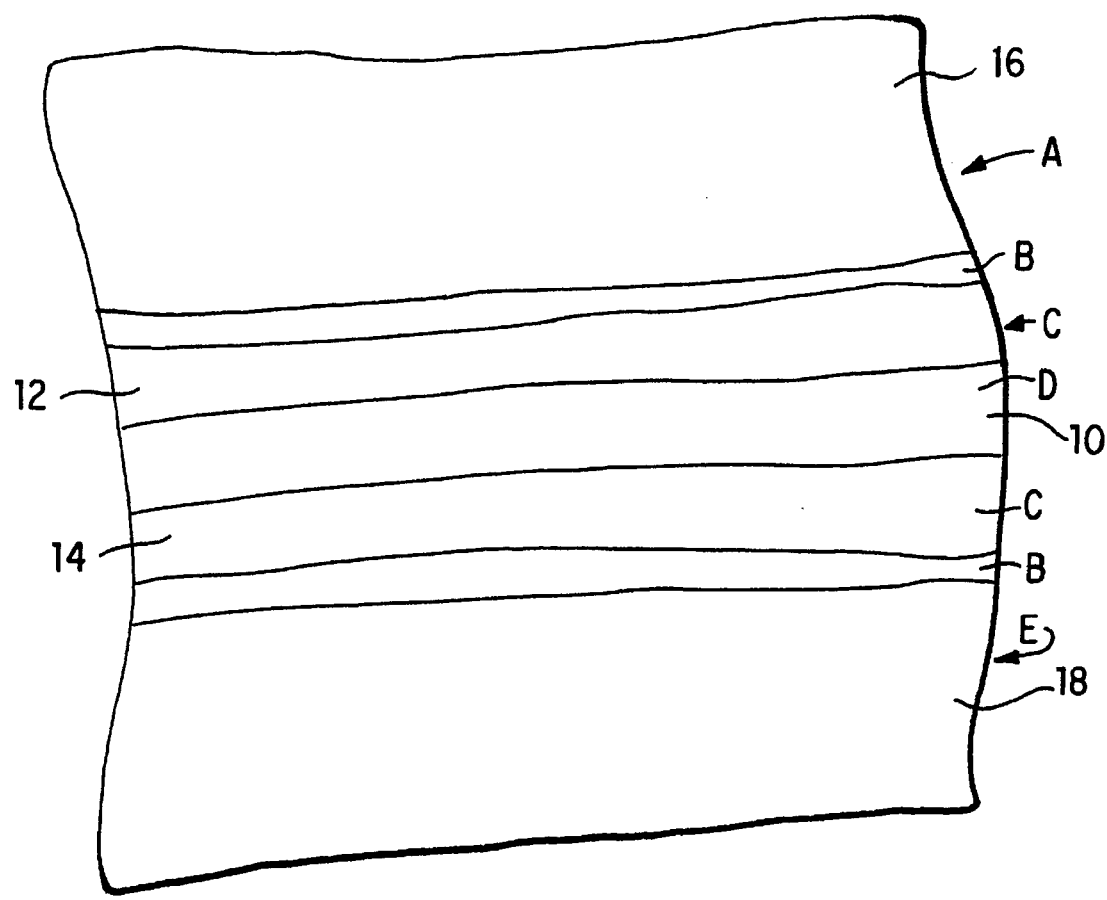

The present invention is directed to a film material which is flexible and extensible but able to withstand significant load without seal failure. It has been found that flexible containers such as pouches and bags formed from the present film, which has a sealing layer comprising an ethylene vinyl acetate/very low density polyethylene blend, provide the the flexibility, extensibility and seal strength required in many packaging applications, including the packaging of large, newly formed cheese blocks. For this application, a sealing layer comprising such EVA/VLDPE blend is combined with at least an oxygen barrier layer, and a layer or layers which provide strength to the overall structure. One of ordinary skill in the art will recognize that the present sealing layer, providing the qualities of flexibility, extensibility and good sealing, may be combined with other film layers providing other desired properties for applications other than cheese packaging. Further, it is to be understood that, although the present disclosure is generally directed to a film of a thickness in the range of from about 3 mils to about 5 mils which includes the sealing layer of the present invention, laminated structures or structures of thicker or thinner gauge may also benefit from the properties of extensibility, flexibility and good sealing provided by the present sealing layer.

Preferably, however, the film of the present invention, such as depicted in FIG. 1, is a coextruded film, most preferably having the structure A/B/C/D/C/B/E where A is a sealing layer, B is an adhesive layer, C is an intermediate layer, D is a barrier core layer, and E is an outer abuse layer. In one embodiment A and E may comprise identical materials, providing a structure which is symmetrical in terms of composition, if not necessarily so with respect to layer thickness. Preferably, the sealing layer A comprises from about 30% to about 40% of the total multilayer film thickness; the adhesive layers B each comprise about 7% of the total film thickness; the intermediate layers C each comprise from about 5% to about 10% of the total film thickness; the barrier core layer D comprises from about 2% to about 6% of the total film thickness, and the outer abuse layer comprises from about 27% to about 36% of the total film thickness. The multilayer film of the present invention is preferably from about 3.0 to about 5.0 mils thick.

Preferably, core layer 10 is a barrier material, most preferably comprising an ethylene vinyl alcohol copolymer. However, other barriers such as vinylidene chloride, nylon and nylon/EVOH blends are also within the scope of the present invention. Commercially available EVOH resins suitable for use in the present core layer include EVAL SC H151B, EVAL EC-105A, both supplied by EVALCA, and Nippon Goshei Soarnol ET. Ethylene content for the EVOH is preferably between about 32% and 44%, and more preferably is at about 38%. Such relatively high ethylene content provides increased flexibility and extensibility to the EVOH core layer.

Intermediate layers 12 and 14, which are disposed on either side of the barrier core layer, are polyamides such as, preferably, nylon 6, nylon 6/66, blends of either of the two, or a blend of an ionomer and either of the two. Generally, nylons of varying viscosities are suitable for the present invention. Commercially available resins for use in these intermediate layers include Ultramid B4 and Ultramid C35, both supplied by BASF, and Allied Capron 8207F. A preferred ionomer for use in the present layers is Surlyn 1601 from DuPont. The polyamides of the intermediate layers 12 and 14 add strength to the resulting multilayer film structure. Blending an ionomer with the polyamide composition of the present layers improves nylon extensibility, most probably by reducing the composition modulus and tensile strength.

Outer layers 16 and 18 most preferably comprise a blend of approximately equivalent amounts of ethylene vinyl acetate copolymers (EVA) and ethylene alpha-olefin copolymers having densities of less than 0.915 g/cc (ULDPE). This EVA/ULDPE blend contributes pliability and extensibility to the resulting film. A preferred ULDPE resin for use in the present invention is Attane 4002 supplied by Dow. A preferred EVA resin is PE 1345 YY from Rexene, which is a 3.3% vinyl acetate EVA with from about 10,800 ppm to about 13,200 ppm of an antiblock agent. Thus, with a 50%/50% blend of these two resins, the sealing layer will contain about 0.6% antiblock. Such antiblocking agent is necessary, as will become more obvious in the discussion below regarding the extrusion of the present film, if the film in tubular form is collapsed onto itself or when pouches, having contiguous sealing layers, are formed. Further, an even greater weight percentage of antiblocking agent is preferably included in the outer abuse layer such that a preferred composition for such is 47.5% ULDPE, 47.5% EVA masterbatch with antiblock and 5% of a masterbatch containing 10% antiblock, thereby providing about 1% antiblock in such layer. Examples of suitable masterbatches include 10,075 ACP Syloid Concentrate from Teknor Color which comprises 89.8% low density polyethylene, 10% Syloid (a silica provided by Davison Chemical), and 0.2% calcium stearate, and EPE 8160, also provided by Teknor Color, which is 90% low density polyethylene and 10% Syloid. At least some minor portion of an anti-blocking agent is preferably included in the outer abuse layer because the excellent sealing properties provided by a ULDPE/EVA blend also cause blocking of adjacent pouches or film rollstock.

For the outer layers, the vinyl acetate content of the ethylene vinyl acetate copolymers may range from about 3% to about 18%, although the lower vinyl acetate percentages are preferred. The ULDPE/EVA ratio is determined for each application by the desirability of the properties provided by each resin. EVA is a good sealant. ULDPE provides flexibility, extensibility and toughness as well as good sealing. Generally, EVA is less expensive than ULDPE. Thus, the degree of flexibility, extensibility and toughness required may be balanced against cost. In the broadest sense, the sealing layer of the present invention may comprise from about 5% to about 95% EVA and from about 5% to about 95% ULDPE. More preferably, the sealing layer comprises from about 25% to about 75% EVA and from about 25% to about 75% ULDPE. Most preferably, the sealing layer comprises from about 40% to about 60% EVA and from about 40% to about 60% ULDPE.

A method for making the film includes the step of blending the ultra low density polyethylene resin, the ethylene vinyl acetate resin, and the anti-blocking agent in the proportions and ranges desired as discussed above with respect to the outer layers. The resins are usually purchased from a supplier in pellet form and can be blended in any one of a number of commercially available blenders as is well known in the art. The anti-blocking masterbatch is generally provided in pellet form.

The resins resin blends for each layer are then fed into the hoppers of extruders which feed the coextrusion die. Thus, for the sealing layer, the ultra low density polyethylene resin and ethylene vinyl acetate resin, as a blend, are fed to the hopper of one extruder which feeds the coextrusion die, while the ULDPE/EVA/antiblock blend required for outer abuse layer 18 is fed to the hopper of another extruder which also feeds the coextrusion die. The ethylene vinyl alcohol copolymer resin or blend, the polyamide resin or blend, and the adhesive resin are likewise fed into respective extruders which feed the coextrusion die. For the symmetrical seven layer film structure discussed above, having the two identical surface layers, two identical adhesive layers and two identical intermediate layers, and the core layer of ethylene vinyl alcohol copolymer, at least four extruders are needed. Five extruders are required when, as is preferred, the sealing layer and the outer abuse layer are of differing composition and/or thickness. Additional extruders may be employed if a film having non-identical adhesive or intermediate layers is desired. The materials are coextruded and immediately blown out to an appropriate diameter depending upon the thickness desired for the final film or the width required for the ultimate pouch. In the latter case, film thickness is controlled by extruder speed, web speed, or both. Cast extrusion is also within the scope of the present invention. Circular coextrusion dies are well known to those in the art and can be purchased from a number of manufacturers. In addition to tubular coextrusion, slot dies could be used to coextrude the present material in sheet form.

The invention may be further understood by reference to the following examples.

EXAMPLE 1

A sample film was prepared by blending 47.5% of ULDPE (Attane 4002 from Dow), 47.5% of EVA having about 1.2% antiblock (PE 1345 YY from Rexene), and 5% EPE-8160 anti-blocking masterbatch. This outside blend layer was coextruded with a core layer containing Soarnol ET EVOH, a 38% ethylene EVOH from Nippon Gohsei, intermediate layers of Capron 8207F, a nylon 6 resin available from Allied Corp, and a sealant layer of a 50% ULDPE/50% EVA (containing a minor amount of antiblock) blend. Plexar 107, an ethylene vinyl acetate-based resin from Quantum, was used as an adhesive material.

The film exhibited an oxygen transmission rate of 3.8 $cc/m^2.24$ hrs. at a total film gauge of about 3.29 mils as measured by ASTM D3985. The film also had a water vapor transmission rate (grams/24 hours, 100 square inches at 100% RH) of about 0.49 at 100° F. (ASTM F372). Typical gauge of the barrier (EVOH) layer was 0.17 mils. Pouches formed from the film exhibited a seal strength of 9.1 psi as measured by ASTM F88. The material exhibited a tensile at break of 4549 psi (ASTM D882, Method A). The material exhibited a modulus of 40,600 psi (ASTM D882, Method A).

EXAMPLE 2

A second sample film was prepared by blending 47.5% of ULDPE (Attane 4002 from Dow), 47.5% of EVA having about 1.2% antiblock (PE 1345 YY from Rexene), and 5% EPE-8160 anti-blocking masterbatch. This outside blend layer was coextruded with a core layer containing Soarnol ET EVOH from Nippon Gohsei, and a sealant layer of a 50%

ULDPE/50% EVA (containing a minor amount of antiblock) blend. The intermediate layers sandwiching the EVOH core were a blend of 85% nylon 6 (Capron 8207 from Allied Corp.) and 15% of Surlyn 1601, a sodium ionomer from DuPont. Again, Plexar 107 was used as an adhesive material.

The film exhibited an oxygen transmission rate of 3.7 cc/m$^2$.24 hrs. at a total film gauge of about 3.31 mils. The film had a water vapor transmission rate (grams/24 hours, 100 square inches at 100% RH) of about 0.47 at 100° F. Typical gauge of the barrier (EVOH) layer was 0.18 mils. Pouches formed from the film exhibited a seal strength of 8.6 psi. The material exhibited a tensile at break of 4287 psi and a modulus of 40,100. All physical properties were measured by the respective methods of Example 1.

EXAMPLE 3

Another sample film was prepared by blending 47.5% of ULDPE (Attane 4002 from Dow), 47.5% of EVA having about 1.2% antiblock (PE 1345 YY from Rexene), and 5% EPE-8160 anti-blocking masterbatch. This outside blend layer was coextruded with a core layer containing Soarnol ET EVOH from Nippon Gohsei, and a sealant layer of a 50% ULDPE/50% EVA (containing a minor amount of antiblock) blend. The intermediate layers sandwiching the EVOH core comprised Ultramid C35, a nylon 6/66 copolyamide available from BASF. Plexar 107 was used as an adhesive material.

The film exhibited an oxygen transmission rate of 3.5 cc/m$^2$.24 hrs. at a total film gauge of about 3.62 mils. The film also had a water vapor transmission rate (grams/24 hours/100 square inches at 100% RH) of about 0.49 at 100° F. (ASTM F 372). Typical gauge of the barrier (EVOH) layer was 0.19 mils. Pouches formed from the film exhibited a seal strength of 8.9 psi. The material exhibited a tensile at break of 5090 psi and a modulus of 40,100 psi. All physical properties were measured by the respective methods of Example 1.

EXAMPLE 4

A sample film was prepared by blending 47.5% of ULDPE (Attane 4002 from Dow), 47.5% of EVA having about 1.2% antiblock (PE 1345 YY from Rexene), and 5% EPE-8160 anti-blocking masterbatch. This outside blend layer was coextruded with a core layer containing EVALCA EVOH having 38% ethylene, and a sealant layer of a 50% ULDPE/50% EVA (containing a minor amount of antiblock) blend. The intermediate layers sandwiching the EVOH core comprised Ultramid C35, a nylon 6/66 copolyamide available from BASF. Plexar 107 was used as an adhesive material.

The film exhibited an oxygen transmission rate of 2.5 cc/m$^2$.24 hrs. at a total film gauge of about 3.59 mils. The film also had a water vapor transmission rate (grams/24 hours/100 square inches at 100% RH) of about 0.50 at 100° F. (ASTM F 372). Typical gauge of the barrier (EVOH) layer was 0.19 mils. Pouches formed from the film exhibited a seal strength of 8.9 psi. The material exhibited a tensile at break of 5370 psi and a modulus of 36,900 psi. All physical properties were measured by the respective methods of Example 1.

EXAMPLE 5

Another sample film was prepared by blending 47.5% of ULDPE (Attane 4002 from Dow), 47.5% of EVA having about 1.2% antiblock (PE 1345 YY from Rexene), and 5% EPE-8160 anti-blocking masterbatch. This outside blend layer was coextruded with a core layer containing EVALCA EVOH having 38% ethylene, and a sealant layer of a 50% ULDPE/50% EVA (containing a minor amount of antiblock) blend. The intermediate layers sandwiching the EVOH core comprised Ultramid B4, a nylon 6 polyamide available from BASF. Plexar 107 was used as an adhesive material.

The film exhibited an oxygen transmission rate of 10.9 cc/m$^2$.24 hrs. at a total film gauge of about 3.19 mils. The film also had a water vapor transmission rate (grams/24 hours/100 square inches at 100% RH) of about 0.62 at 100° F. (ASTM F 372). Typical gauge of the barrier (EVOH) layer was 0.06 mils. Pouches formed from the film exhibited a seal strength of 7.7 psi. The material exhibited a tensile at break of 4601 psi and a modulus of 27,500 psi. All physical properties were measured by the respective methods of Example 1.

EXAMPLE 6

A sample film was prepared by blending 47.5% of ULDPE (Attane 4002 from Dow), 47.5% of EVA having about 1.2% antiblock (PE 1345 YY from Rexene), and 5% EPE-8160 anti-blocking masterbatch. This outside blend layer was coextruded with a core layer containing EVALCA EVOH having 38% ethylene, and a sealant layer of a 50% ULDPE/50% EVA (containing a minor amount of antiblock) blend. The intermediate layers sandwiching the EVOH core comprised a blend of 85% Ultramid B4 from BASF and 15% Surlyn 1601 from DuPont. Plexar 107 was used as an adhesive material.

The film exhibited an oxygen transmission rate of 8.9 cc/m$^2$.24 hrs. at a total film gauge of about 3.07 mils. The film also had a water vapor transmission rate (grams/24 hours/100 square inches at 100% RH) of about 0.61 at 100° F. (ASTM F 372). Typical gauge of the barrier (EVOH) layer was 0.06 mils. Pouches formed from the film exhibited a seal strength of 6.6 psi. The material exhibited a tensile at break of 3942 psi and a modulus of 27,100 psi. All physical properties were measured by the respective methods of Example 1.

EXAMPLE 7

A further sample film was prepared by blending 47.5% of ULDPE (Attane 4002 from Dow), 47.5% of EVA having about 1.2% antiblock (PE 1345 YY from Rexene), and 5% EPE-8160 anti-blocking masterbatch. This outside blend layer was coextruded with a core layer containing Soarnol ET EVOH supplied by Nippon Gohsei, and a sealant layer of a 50% ULDPE/50% EVA (containing a minor amount of antiblock) blend. The intermediate layers sandwiching the EVOH core comprised a blend of 85% Ultramid B4 from BASF and 15% Surlyn 1601 from DuPont. Plexar 107 was used as an adhesive material.

The film exhibited an oxygen transmission rate of 8.4 cc/m$^2$.24 hrs. at a total film gauge of about 3.12 mils. The film also had a water vapor transmission rate (grams/24 hours/100 square inches at 100% RH) of about 0.61 at 100° F. (ASTM F 372). Typical gauge of the barrier (EVOH) layer was 0.06 mils. Pouches formed from the film exhibited a seal strength of 6.7 psi. The material exhibited a tensile at break of 4161 psi and a modulus of 28,700 psi. All physical properties were measured by the respective methods of Example 1.

EXAMPLES 8–11

Three film samples were prepared as set forth in Examples 1–7 above and were compared to a prior art structure for a determination of improvement in flexibility, elongation and strength. The formulation of each stucture from sealant layer to outside layer is set forth below in Table 1.

TABLE 1

Ex. 8

50% VLDPE/Tie₁/50% Nylon₁/EVOH₁/50% Nylon₁/Tie₁/47.5% VLDPE
50% EVA / /50% Nylon₂/ /50% Nylon₂/ /47.5% EVA
/5% antiblock
34.1%   6.7%8.4%   3.7%   9.4%   6.7%31.1%

Ex. 9

50% VLDPE/Tie₁/75% Nylon₁ /EVOH₁/75% Nylon₁ /Tie₁/47.5% VLDPE
50% EVA / /25% ionomer/ /25% ionomer/ /47.5% EVA
/5% antiblock
36.8%   6.6%5.8%   3.6%   6.6%   6.6%34.1%

Ex. 10

50% VLDPE/Tie₁/Nylon₁/EVOH₁/Nylon₁/Tie₁/47.5% VLDPE
50% EVA /   /47.5% EVA
/5% antiblock
34.5%   6.3%8.7%   3.6%   9.5%   6.3%31.2%

Comp. Ex. 11

LDPE/Tie₂/Nylon₃/EVOH₂/Nylon₃/Tie₂/LDPE
28.9% 6.6%12.6% 6.4%  9.8%  6.6%29.1%

The resins used in each of the above structures are set forth in Table 2.

TABLE 2

| Resin | Trade Name | Supplier | Description |
|---|---|---|---|
| VLDPE | Attane 4002 | Dow | ethylene octene copolymer, 0.912 g/cc |
| EVA | PE 1345YY | Rexene | ethylene vinyl acetate copolymer with 3% VA and antiblock |
| antiblock | 10,075 ACP | Teknor Color | 89% low density polyethylene, 10% Syloid, 0.2% calcium stearate antiblock modified low density polyethylene |
| LDPE | NA 345-166 | Quantum USI | |
| Tie₁ | Plexar 107 | Quantum USI | anhydride grafted polyolefin in EVA |
| Tie₂ | Plexar 3 | Quantum USI | EVA copolymer modified with high density poly ethylene |
| Nylon₁ | Ultramid B4 | BASF | Nylon 6, 4.0 viscosity |
| Nylon₂ | Ultramid C35 | BASF | Nylon 6/66 copolyamide |
| Nylon₃ | Capron 8207F | Allied | Nylon 6 |
| ionomer | Surlyn 1601 | DuPont | Nylon sodium ionomer |

Pouches composed of each of the films of Examples 8–10 and Comparative Example 11 were stored for 72 hours under ambient, tropic and desert conditions. Each pouch was subjected to a loader trial on a Wincanton tower loader from Stoelting. Each of the pouches of Examples 8–10 passed the Stoelting loader test which requires no seal failure for pouches subjected to each condition. The pouch made in accordance with Comparative Example 11 failed the test. Test results and physical properties of each pouch film are listed below in Table 3.

TABLE 3

| | Ex. 8 | Ex. 9 | Ex. 10 | Ex. 11 |
|---|---|---|---|---|
| Loader trials | pass | pass | pass | fail |
| Tensile at break (psi) | 5051 | 3997 | 4907 | 5547 |
| Tensile at yield (psi) | 2526 | 2093 | 2633 | 3958 |
| Elongation at yield (%) | 15.9 | 17.3 | 15.8 | 11.6 |
| Modulus (psi) | 42 | 35 | 48 | 82 |
| % Nylon 6 | 8.9 | 9.3 | 18.2 | 22.4 |
| % Nylon 6/66 | 8.9 | — | — | — |
| % Ionomer | — | 3.1 | — | — |
| % EVOH (38% ethylene) | 3.7 | 3.6 | 3.6 | — |
| % EVOH (32% ethylene) | — | — | — | — |
| Seal stength (psi) | 8.6 | 8.5 | 10.5 | 10.3 |
| Thickness | 3.26 | 3.32 | 3.51 | 3.35 |

Each of the films of Examples 8–10 demonstrated significantly lower modulus and tensile strengths and higher elongation at yield as compared to the film of Example 11. It is believed that such changes are effected by some combination of the reduction of nylon and EVOH percentages in the total structure, the replacement of low density polyethylene with VLDPE and EVA in the outer layers, the increase in ethylene content of the EVOH barrier layer from 32% to 38%, and the addition of ionomer to the polyamide layers.

For packaging of newly formed cheese blocks, the film of the present invention is preferably not stretch oriented, and, therefore, is preferably a non-shrinkable film. The film is also, preferably, not irradiated. However, in applications where orientation or irradiation of the film are desired, such methods for processing of the present film are not beyond the scope of the present invention. It is also preferred that, for the present application, pouches for the packaging of such newly formed cheese blocks are formed in-line.

Various changes and modifications to the invention can be made by one skilled in the art without departing from the scope of the claims as presented below.

What is claimed is:

1. A method of making a film comprising:

blending from about 5% to about 95% by weight of ethylene vinyl acetate copolymer having from about 3% to about 18% by weight of vinyl acetate with from about 5% to about 95% by weight of ethylene/alpha-olefin copolymer having a density of less than about 0.915 g/cc;

extruding said blend through a circular coextrusion die;

immediately blowing the extrudate to a diameter appropriate for achieving the desired thickness for the final film;

cooling the coextruded film; and collapsing the cooled film.

2. The method set forth in claim 1 further including the step of forming pouches from said film in-line with said steps of extruding, blowing, and cooling.

3. A method of making a film comprising:

coextruding an inner sealing layer comprising from about 25% to about 75% by weight of ethylene vinyl acetate copolymer and from about 25% to about 75% by weight of ethylene/alpha-olefin copolymer having a density of less than about 0.915 g/cc, a barrier layer and an abuse layer comprising a blend of ethylene vinyl acetate copolymer, ethylene/alpha-olefin copolymer having a density of less than about 0.915 g/cc, and an antiblock agent;

immediately expanding the extrudate to a dimension appropriate for achieving the desired thickness of the final film; and cooling the film.

4. A method as in claim 3, wherein said step of coextruding further comprises coextruding a first polyamide internal layer with and immediately adjacent to a first surface of said barrier layer.

5. A method as in claim 4, wherein said step of coextruding further comprises coextruding a second polyamide layer with and immediately adjacent to the second surface of said barrier layer.

6. A method as in claim 5, wherein the first and second internal layers each comprises a blend of a polyamide and an ionomer.

7. A method as in claim 3, wherein said barrier layer comprises ethylene vinyl alcohol copolymer.

8. A method as in claim 3, wherein said ethylene vinyl acetate copolymer comprises from about 40% to about 60% by weight of said sealing layer and said ethylene/alpha-olefin copolymer comprises from about 40% to about 60% by weight of said sealing layer.

9. A method as in claim 8, wherein said ethylene vinyl acetate copolymer comprises from about 45% to about 50% by weight of said sealing layer and said ethylene/alpha-olefin copolymer comprises from about 45% to about 55% by weight of said sealing layer.

10. A method as in claim 8, wherein said step of coextruding further comprises coextruding a first polyamide internal layer with and immediately adjacent to a first surface of said barrier layer.

11. A method as in claim 10, wherein said step of coextruding further comprises coextruding a second polyamide layer with and immediately adjacent to the second surface of said barrier layer.

12. A method as in claim 11, wherein the first and second internal layers each comprises a blend of a polyamide and an ionomer.

13. A method as in claim 12, wherein said barrier layer comprises ethylene vinyl alcohol copolymer.

* * * * *